Sept. 22, 1953  P. DE ANGUERA  2,652,864
MACHINE FOR CUTTING DEFECTIVE SECTIONS FROM LUMBER
Filed June 14, 1948  3 Sheets-Sheet 1

INVENTOR.
Philip de Anguera
BY
Murray, Sackhoff & Pallack
ATT'YS

Sept. 22, 1953 P. DE ANGUERA 2,652,864
MACHINE FOR CUTTING DEFECTIVE SECTIONS FROM LUMBER
Filed June 14, 1948 3 Sheets-Sheet 2

INVENTOR.
Philip de Anguera
BY
ATT'YS

Sept. 22, 1953       P. DE ANGUERA       2,652,864

MACHINE FOR CUTTING DEFECTIVE SECTIONS FROM LUMBER

Filed June 14, 1948       3 Sheets-Sheet 3

INVENTOR.
Philip de Anguera
BY
Murray, Sachnoff & Paddack
ATT'YS

Patented Sept. 22, 1953

2,652,864

UNITED STATES PATENT OFFICE 2,652,864

MACHINE FOR CUTTING DEFECTIVE SECTIONS FROM LUMBER

Philip de Anguera, Cincinnati, Ohio, assignor to Graham Tie Dowel Service Company, Columbus, Ohio, a corporation of Ohio Application June 14, 1948, Serial No. 32,934

8 Claims. (Cl. 143—46)

This invention relates to wood sawing devices and is particularly directed to an automatic machine and method for cutting defective portions or sections from culled lumber which is in the form of strips, boards or planks.

Lumber free from defects such as knots, checks, and the like, is desirable in all types of construction work, and is a positive necessity in constructing floors for heavy duty-wear resistant type service such as in factories, roller rinks, or the like. It is the main object of this invention to provide a sawing machine and method which will facilitate the removal of defective sections from lengths of culled lumber and to this end, the machine is operated by a master control switch which is actuated by an extrinsic object secured to the lumber adjacent the defective portion therein before said lumber is fed to the machine.

Another object of the invention is to provide an efficient and simplified machine for cutting sections from lumber comprising a pivoted frame which, in initial position, has a normally operable work feeding means and an inoperative sawing device that is shiftable to a second position where it renders the work feeding means inoperative and passes the sawing device through the work.

A further object of the invention is to provide in a novel wood sawing machine having the foregoing characteristics, a means for its automatic operation, said means comprising the affixation of a physical marker to culled lumber at places adjacent the defective portions therein, said markers being adapted to actuate a control on the machine during passage of the lumber therethrough to render the lumber feed system for the machine inoperative and simultaneously operate the lumber sawing devices.

Other objects will be apparent from the following specification taken in conjunction with the accompanying drawings which illustrate a preferred embodiment of my invention, it being understood that I am not limited to the particular structure shown except in so far as is set forth in the appended claims.

In the drawings, wherein like reference numerals indicate similar parts throughout the several views.

Figure 1:
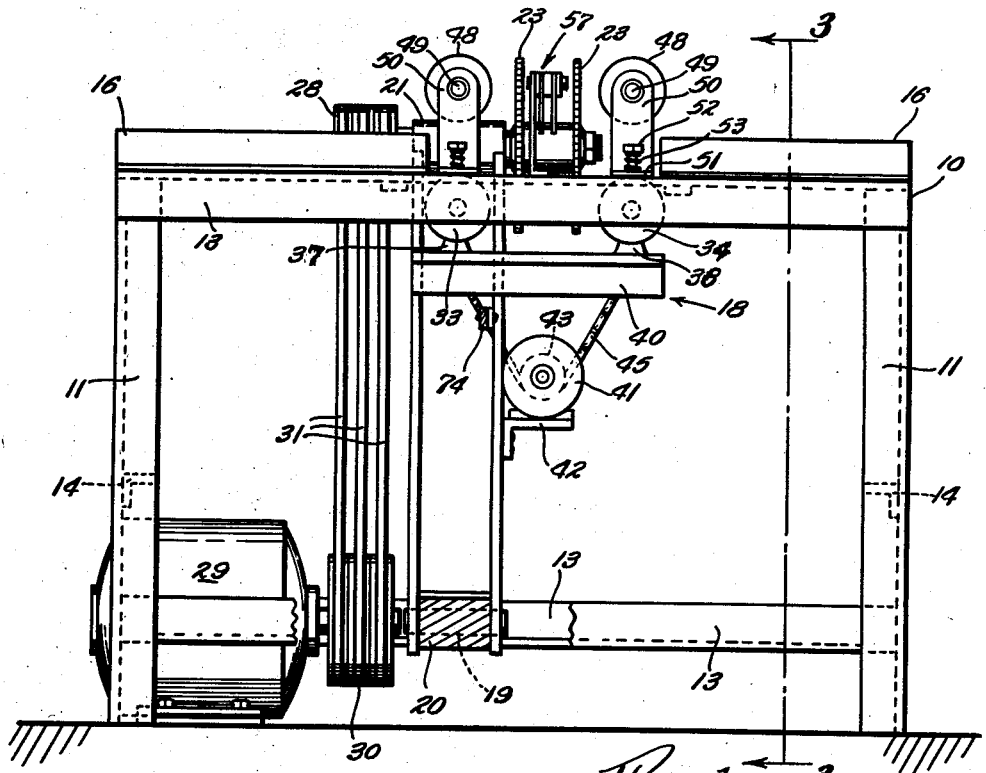
Fig. 1 is a front elevation of the machine with parts being broken away, and other parts being shown in cross-section.

The sawing machine comprises a rectangular table 10 having pairs of front legs 11—11 and rear legs 12—12 all supporting the corners of the table and which are interconnected by longitudinal structural members 13—13 and transverse members 14—14 to form a rigid frame work for mounting the coordinated mechanisms of the machine. As most clearly illustrated in Fig. 2, a work guide extends longitudinally along the top of the table and comprises a pair of longitudinally spaced channels each formed by two transversely spaced angle irons 15 and 16 and a bottom plate 17 all secured to the table top and adapted to permit endwise passage of successive strips of culled lumber therebetween.

A shiftable carriage 18 is mounted for oscillatory movement on a rock shaft 19 which in turn is journaled in a bearing member 20 extending transversely between the lower longitudinal frame members 13—13. The carriage preferably comprises an upwardly extending I-beam which has welded to its upper end a bearing block 21 for journalling a drive shaft 22 to which is fixed the cutoff devices of the machine. Preferably the cut-off devices comprise a pair of spaced circular saws 23—23 mounted concentrically on the drive shaft 22. The drive shaft has a shoulder 24 (Fig. 5) formed thereon and an externally threaded end 25, and the saws are removably fixed to said shaft by a series of mounting rings 26 which are drawn up tight against the shoulder by a nut 27 cooperating with the threads 25. The saws are driven by a set of V-shaped pulleys 28 fixed to the opposed end of said shaft, said pulleys being continuously driven by a motor 29 which has secured to its motor shaft a set of V-pulleys 30 disposed in coaxial alignment with the rock shaft 19 for the carriage 18. A set of V-belts 31 runs over the sets of pulleys 28 and 30, and it will be noted that because of the coaxial alignment of the motor pulleys 30 with the rock shaft 19 of the carriage, the circular saws are continuously driven through the belts which are maintained under a constant, predetermined driving tension.

Figure 2:
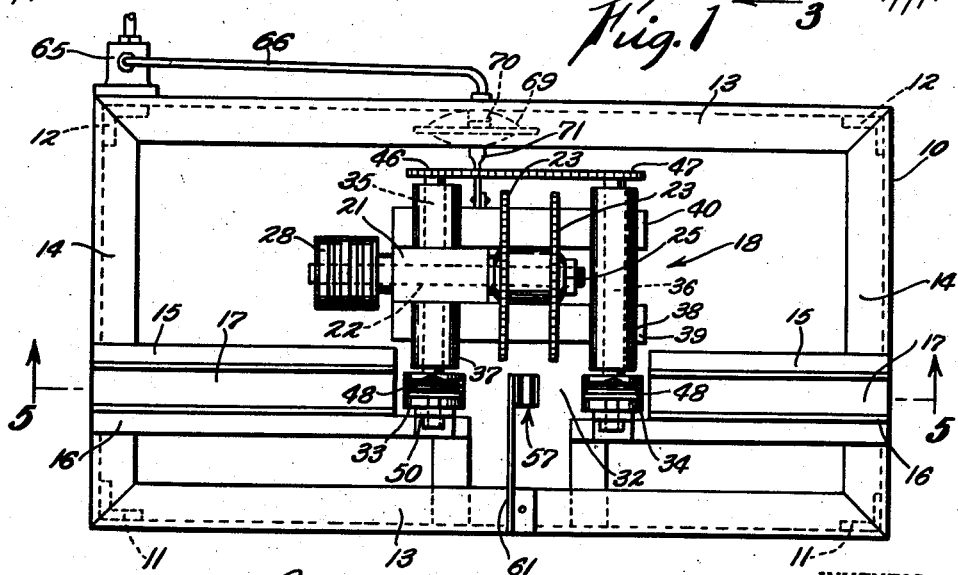
Fig. 2 is a top plan view of the machine shown in Fig. 1.
Figure 3:
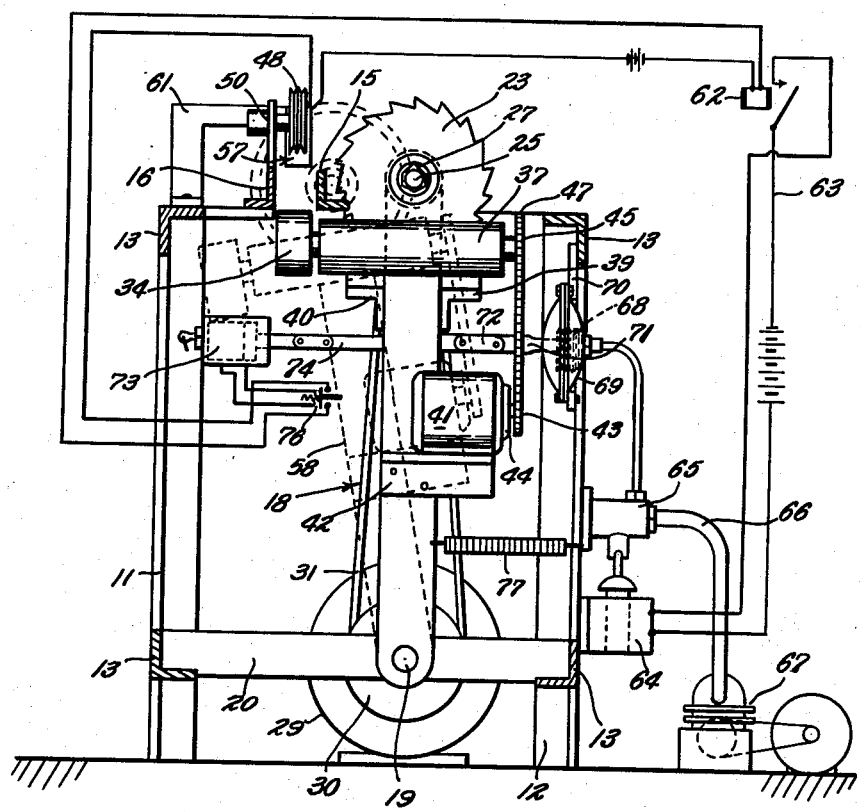
Fig. 3 is a section taken on line 3—3 of Fig. 1, parts being shown diagrammatically.

The circular saws rotate in spaced parallel planes normal to the longitudinal work guides 15 and 16, and the carriage is rockable on its shaft 19 in a plane which is also normal to the work guide whereby a pair of transverse cuts are made through the work by the saws upon actuation of the carriage toward its maximum feed position illustrated in dotted lines in Fig. 3. As indicated in Figs. 2 and 5, the work guide is interrupted at 32 to provide clearance for the passage of the saws 23—23 through the lumber disposed in the guide.

A pair of work feeding rollers 33 and 34 are mounted on the carriage on parallel axes positioned normal to the longitudinal extent of the work guide. These rollers are secured to the ends of drive shafts 35 and 36 respectively journaled in bearing blocks 37 and 38, welded to spaced angle irons 39 and 40. The angle irons are welded to opposed sides of the upper end of the carriage 18 just beneath the journal bearing 21 for the circular saws. The rollers are driven in unison by a motor 41 mounted on a bracket 42 secured to the carriage, said motor being connected to a sprocket 43 through a speed reducer 44. The sprocket drives a chain 45 that passes over sprockets 46 and 47 fixed to the ends of feed roller drive shafts 35 and 36 respectively. During operation of the machine the motor 41 is in continuous operation and through its drive connection continuously rotates the rollers 33 and 34 in work feeding directions (Fig. 5). It will be noted, with particular reference to Figs. 3 and 5, that when the rollers are in normal driving contact with the undersides of the culled lumber strips as they are successively moved through the work guides by the rollers, said drive rollers raise the strips slightly above the bottom plate 17 of the guides. Each feed roller has a peripherally corrugated hold-down roller 48 disposed vertically above it, and, as illustrated in Fig. 1, each hold-down roller is mounted on a stub shaft 49 having its end mounted on a separate section 50 of each work guide 16, said section having a horizontal flange 51 resiliently mounted on a frame member 13 by a bolt 52 which passes through the flange end member and has a compression spring 53 encircling it and bearing upon the flange 51.

Figure 4:
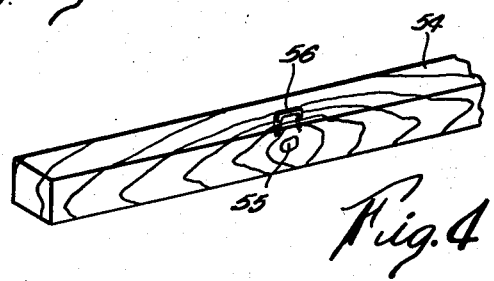
Fig. 4 is a perspective view of a piece of culled lumber illustrating a manner in which a physical object is affixed thereto adjacent a defective portion for actuating a control on my wood sawing device.

Lumber which has defects therein, such as knots, checks, or the like, are introduced into the machine and therefore a stack of lumber is first inspected and the defective pieces are separated therefrom and marked by the inspector by affixing an extrinsic object thereon at places adjacent the defects. As illustrated in Fig. 4, the culled lumber 54, has a knot 55 therein, which is marked with an electric contact object such as a brad 56 secured in the lumber adjacent the defective lumber portion 55. For the purpose of affixing the brad to the lumber a brad hammer is used which is readily obtainable on the market and need not be specifically described herein. The marked lumber is manually placed upon the work guide with its forward end between the feed roller 34 and its complementary corrugated hold-down roller 48, which advances the lumber through the machine, it being noted that the corrugations in the hold-down roller preclude bending of the brad to such an extent as to move it out of the path of a machine control switch 57 disposed adjacent the intersection of the path of the cut-off device and the work guide. The marker is generally adapted to actuate this responsive control switch 57, which in turn conditions a power means for oscillating the carriage 18 thereby shifting it from its inoperative position, illustrated in full lines in Fig. 3, toward the dotted line position indicated by reference numeral 58 in said figure. This carriage movement initially renders the work feed rollers inoperative by moving them out of contact with the underside of the work piece. Upon movement of the feed roller away from the strip, the hold-down rollers 48—48 push the strip down against the bottom plates 17—17 in the guides which instantly stops the momentum of the strip and allows the saws to move through the strip which has come to rest nearly simultaneously with the disengagement of the feed rollers therefrom.

Figure 5:
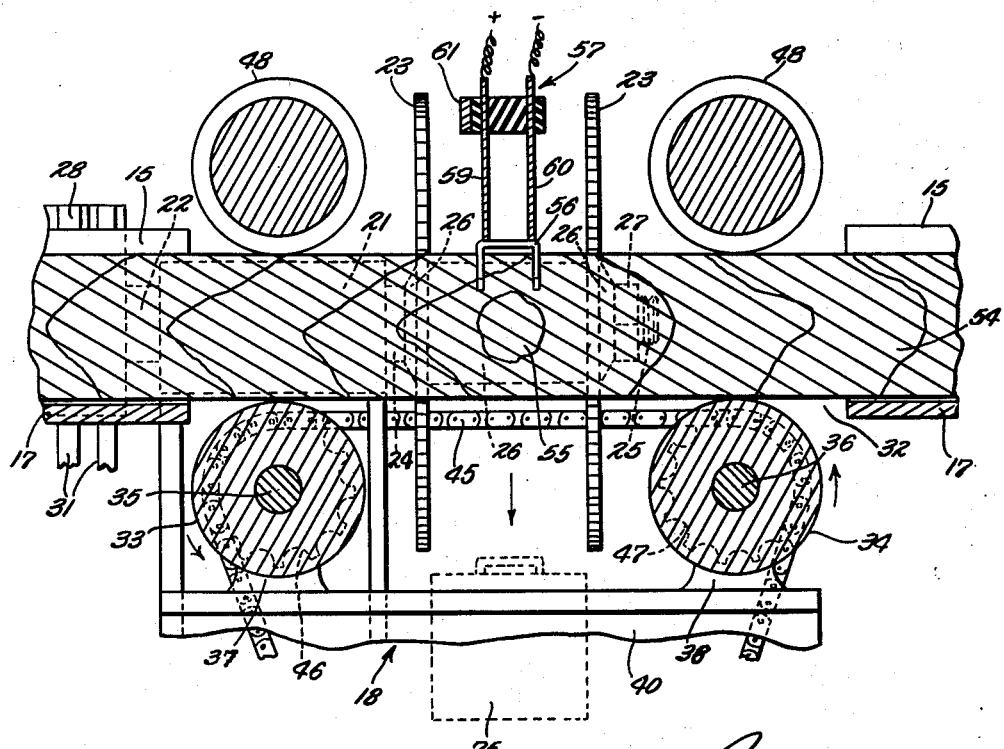
Fig. 5 is an enlarged cross-section of my machine taken along line 5—5 of Fig. 2 with a piece of lumber in the work guide therefor.

As illustrated in Fig. 5, the control switch 57 comprises a pair of electrodes 59 and 60 insulated from each other, and mounted upon a standard 61 which in turn is supported by the transverse member 13 between the planes of movement of the saws 23—23. The lower ends of the electrodes are disposed in the path of the brad 56 on the culled lumber strip in the work guide, and upon passage of the lumber along the work guide the brad acts to bridge the electrodes, thus closing through relay 62 (Fig. 3) an electric circuit 63 of a solenoid 64 mounted on the machine frame. The actuation of the solenoid opens an air valve 65 interposed in a compressed air-line 66 connected at one end to a source of compressed air 67 and at its other end to a bellows 68. The bellows is mounted within a housing 69 which in turn is fixed to the frame by brackets 70. The movable end of the bellows has secured to it an operating rod 71 which is connected to an intermediate part of the rockable carriage by a link 72. The feeding speed of the carriage may be regulated by a suitable air valve 73 connected to the carriage by a link 74 and positioned in opposed relation to the action of the bellows operated rod 72.

It will therefore be understood that upon the bridging of the electrodes 59 and 60 by the brad 56, the carriage 18 is rocked upon its shaft 19 by the solenoid controlled, pneumatic motor 69 for the machine, and upon initial actuation of the carriage toward its saw-feeding direction, the work feed rollers are disengaged from the work thereby permitting the hold-down rollers to force the work against the bottom of the work guide and instantly stop the work for operation thereon by the circular saws 23—23 which then contact and pass through the work. When the saws have completed their respective cuts through the work on opposed sides of the defective portion, said defective portion (shown by dotted lines 75 in Fig. 5) with the brad thereon falls through the opening 32 formed between the spaced work guides. As illustrated in Fig. 3 the full operative position of the carriage opens a normally spring closed limit switch 76 mounted on the frame and having its contacts connected in series in the circuit for the relay 62 whereupon contact is broken between the electrodes 59 and 60, the carriage power means is rendered inoperative, and the carriage is returned to its inoperative position by a spring 77 extending between the carriage 18 and the frame member. Upon return to said inoperative position the feed rollers again contact the lumber in the guideway and continue to move it until a succeeding brad again bridges the electrodes to operate the work sawing devices.

My machine has been illustrated in the drawing and described in the specification as having a pair of circular saws as its preferred strip cutoff device. It is contemplated that a single cut-off device could be used such as one circular saw mounted on drive shaft 21. In that event a pair of markers would be used to define the limits of one defective portion in the culled lumber strips which would successively actuate the machine saw to cut off said defective portion instead of in one machine actuation in the case of the preferred form of my machine having the pair of spaced cut-off devices.

Other extrinsic objects may be used as objects for marking the defective portion of the culled lumber strips and it is contemplated that other machine control switches may be used for cooperation with such markers, as for instance the marker could be a strip of reflective paint applied to the strip adjacent a defect therein which would upon movement of the strip through the machine actuate an electric eye arrangement mounted on the machine in the position of the electrodes 59—60 and which on actuation would operate the power means for the cut-off devices.

What is claimed is:

1. In a wood-working device, a pair of spaced work guides extending along the top of the table in longitudinal alignment, an oscillatory carriage mounted on the table and normally disposed in inoperative position, said carriage being transversely shiftable relative to the longitudinal extent of the work guides, a pair of spaced saws carried by the carriage and shiftable edgewise thereby into and away from the space between the work guides, a continuously operable source of power for the saws, feed rollers mounted on the carriage on each side of the saws and normally adapted to contact the work and to disengage the work during oscillating movement of the carriage, means for continuously driving said rollers, work pressure rollers mounted on the table in opposition to the feed rollers and operable to normally urge the work against the feed rollers when the carriage is in inoperative position and to urge the work against the table during oscillatory movement of said carriage, a switch mounted on the table between the saws and adapted for actuation by a device pre-secured adjacent a defective portion in the work, power means under the control of the switch for shifting the carriage toward the work, and means actuated by the movement of the carriage for returning the carriage to inoperative position upon severance of the defective portion from the work.

2. In a wood-working device, a table, a pair of spaced, channel-shaped work guides extending along the top of the table in longitudinal alignment, an oscillatory carriage normally positioned on the table in inoperative position and transversely shiftable toward and away from the work guides, a saw carried by the carriage and shiftable edgewise thereby into and away from the space between the work guides, a continuously operable source of power for the saw, a feed roller mounted on the carriage and normally adapted to contact the underside of the work when the carriage is in inoperative position and to disengage the work during shifting movement of the carriage, means for continuously driving said roller, a yieldable work pressure roller mounted on the table in opposition to the feed roller and acting to normally urge the work against the feed roller when the carriage is in in operative position and to urge the work against the table during shifting movement of the carriage, a switch mounted on the table adjacent the saw and adapted for actuation by a device secured adjacent a defective portion in the work, power means under the control of the switch for shifting the carriage toward the work, and means actuated by the movement of the carriage for returning the carriage to inoperative position upon severance of the defective portion from the work.

3. In a wood-working device for cutting defective portions from culled lumber, a table, a pair of spaced channels extending along the top of the table in longitudinal alignment and adapted to guide culled lumber therethrough, extrinsic objects affixed to the lumber adjacent the defects therein, an oscillatory carriage normally disposed on the table in inoperative position and transversely shiftable relative to the longitudinal extent of the lumber channels, a pivotal support for the carriage positioned near the base of the table, a continuously rotated shaft journaled in the upper end of the carriage in parallelism with the lumber channels, a pair of circular saws mounted coaxially in spaced positions on the rotated shaft and shiftable edgewise by movement of the carriage into and away from the space between the lumber channels, a pair of continuously driven shafts journaled in the carriage on each side of and at right angles to the rotated shaft, feed rollers fixed to the driven shafts and normally held by the carriage against the undersides of the lumber in the channels and disengaged from the lumber when the carriage is oscillated, a switch mounted on the carriage between the saws and in position for actuation by the extrinsic objects on the lumber as it is passed through the channels by the feed rollers, power means under the control of the switch for shifting the carriage toward the work, and means for returning the carriage to inoperative position upon severance of the defective portion from the lumber.

4. In a wood sawing device the combination of a longitudinal work guide, a laterally shiftable carriage normally positioned in inoperative position beside the work guide, a cut-off device mounted on the carriage and movable thereby across the work guide, means for continuously actuating the cut-off device, a work feeding roll mounted on the carriage and adapted to frictionally contact the work when the carriage is in normal inoperative position and to disengage the work when the carriage is shifted, means for continuously actuating the feeding roll, a switch mounted beside the work guide and adjacent the path of the cut-off device and adapted for actuation by an irregularity on the work in the guide, drive means for shifting the carriage, and means for operatively connecting the switch to said drive means.

5. In a wood sawing device the combination of a longitudinal work guide, a laterally shiftable carriage, a cut-off device mounted on the carriage and movable thereby across the work guide, a work feeding roll mounted on the carriage and adapted to normally frictionally contact the work, a hold-down roll mounted on the work guide opposite to the feed roll and in continuous yielding contact with the work, means for continuously actuating the feeding roll, a switch mounted beside the work guide and adjacent the path of the cut-off device and adapted for actuation by an irregularity on the work in the guide, drive means for the carriage, and means for operatively connecting the switch to said drive means to shift the carriage to first disengage the feeding roll from the work and to then feed the cut-off device through the work adjacent the irregularity on the work.

6. In a wood sawing device the combination of a table, a longitudinal work guide upon the table, a laterally oscillatory carriage pivotally mounted on the table and normally disposed in inoperative position beside the work guide, a circular saw mounted on the carriage and movable therewith edgewise across the work guide, power means for continuously actuating the saw, a work feeding roll mounted on the carriage and disposed thereby in operative feeding position in engagement with the work in the guide when the carriage is in inoperative position and to disengage the work during oscillation of the carriage, power means for continuously actuating the feeding roll, shifting means for the carriage, and switch means for operating the shifting means, said switch means being mounted on the table adjacent the intersection of the path of the saw and the work guide.

7. A machine for cutting defective portions from lengths of culled lumber having markers adjacent the defects comprising a table, a longitudinal work guide for the table, a laterally shiftable carriage, a set of cut-off devices mounted in spaced relation on the carriage and normally out of contact with the lumber, a work driver on the carriage normally in engagement with the work, and in disengagement with the work during shifting movement of the carriage, power means for shifting the carriage, and switch means mounted on the table between the cut-off devices and responsive to the passage of said markers to actuate the power means.

8. A machine for cutting deffective portions from lengths of culled lumber comprising a table, an elongated work guide on the table, a frame pivotally mounted on the table normally disposed beside the work guide in inoperative position and adapted for oscillating movement in a direction normal to the guide, a power means for oscillating the frame, a cut-off device carried by the frame and adapted upon frame oscillation to move in a path across the work guide, a work driver mounted on the frame in contact with the work when the frame is in normal inoperative position and to be disengaged from the work during oscillation of the frame, a switch means for the power means positioned on the table adjacent the saw and made operative by a physical marker secured to the lumber adjacent a defective portion therein.

PHILIP DE ANGUERA.

References Cited in the file of this patent

UNITED STATES PATENTS

| Number | Name | Date |
|---|---|---|
| 189,628 | Kautz | Apr. 17, 1877 |
| 410,777 | Abbott | Sept. 10, 1889 |
| 715,631 | Ayres | Dec. 9, 1902 |
| 1,185,787 | Ford | June 6, 1916 |
| 1,385,369 | Ferrier | July 26, 1921 |
| 1,569,186 | Hilke et al. | Jan. 12, 1926 |
| 1,745,873 | Stoltz | Feb. 4, 1930 |
| 1,757,204 | Magill | May 6, 1930 |
| 1,827,349 | Bing | Oct. 13, 1931 |
| 1,856,169 | Rosener et al. | May 3, 1932 |
| 2,251,306 | Thompson | Aug. 5, 1941 |
| 2,335,528 | Neils | Nov. 30, 1943 |

FOREIGN PATENTS

| Number | Country | Date |
|---|---|---|
| 539,365 | Germany | Nov. 27, 1931 |